United States Patent
Cooper et al.

(10) Patent No.: US 7,761,346 B2
(45) Date of Patent: Jul. 20, 2010

(54) SYSTEM, METHOD AND COMPUTER PROGRAM PRODUCT FOR PROVIDING A MULTIDIMENSIONAL INVENTORY MANAGEMENT SYSTEM

(75) Inventors: Michael B. Cooper, Baltimore, MD (US); R. Paul Gorman, Reisterstown, MD (US)

(73) Assignee: Agentsmith, Inc., Baltimore, MD (US)

( * ) Notice: Subject to any disclaimer, the term of this patent is extended or adjusted under 35 U.S.C. 154(b) by 2115 days.

(21) Appl. No.: 10/289,383

(22) Filed: Nov. 7, 2002

(65) Prior Publication Data

US 2004/0093286 A1   May 13, 2004

(51) Int. Cl.
    G06Q 10/00   (2006.01)
    G06F 17/60   (2006.01)
(52) U.S. Cl. .......................... 705/28; 705/10
(58) Field of Classification Search ............. 705/28–30
    See application file for complete search history.

(56) References Cited

U.S. PATENT DOCUMENTS

| | | | |
|---|---|---|---|
| 3,605,089 A | 9/1971 | Gray | |
| 3,651,478 A | 3/1972 | Shandlay | |
| 4,025,766 A | 5/1977 | Ng et al. | |
| 4,509,123 A | 4/1985 | Vereen | |
| 4,700,295 A | 10/1987 | Katsof et al. | |
| 5,216,594 A | 6/1993 | White et al. | |
| 5,241,467 A | 8/1993 | Failing et al. | |
| 5,383,112 A | 1/1995 | Clark | |
| 5,594,899 A | 1/1997 | Knudsen et al. | |
| 5,615,109 A | 3/1997 | Eder | |
| 5,630,121 A | 5/1997 | Braden-Harder et al. | |
| 5,712,989 A | 1/1998 | Johnson et al. | |
| 5,758,328 A | 5/1998 | Giovannoli | |
| 5,758,329 A | 5/1998 | Wojcik et al. | |
| 5,761,432 A | 6/1998 | Bergholm et al. | |
| 5,765,143 A | 6/1998 | Sheldon et al. | |
| 5,771,172 A | 6/1998 | Yamamoto et al. | |
| 5,848,399 A | 12/1998 | Burke | |
| 5,854,746 A | 12/1998 | Yamamoto et al. | |
| 5,870,733 A | 2/1999 | Bass et al. | |
| 5,960,414 A | 9/1999 | Rand et al. | |
| 6,253,187 B1 * | 6/2001 | Fox ............................ | 705/10 |
| 2003/0036981 A1 * | 2/2003 | Vaughan et al. ............... | 705/28 |

OTHER PUBLICATIONS

Planning Your Material Requirements, R W Hall, Harvard Business Review, and vol. 56, Issue: 5, dated Sep./Oct. 1978.*

* cited by examiner

*Primary Examiner*—Matthew S Gart
*Assistant Examiner*—Garcia Ade
(74) *Attorney, Agent, or Firm*—Shook, Hardy & Bacon LLP

(57) ABSTRACT

A computer-implemented method of generating a package of advertising inventory items in response to a set of buyer requirements while optimizing both buyer preferences and a station's revenue objectives given an expected demand can include: selecting a set of candidate inventory items from an inventory of inventory items available for presenting advertising spots, where the set of candidate inventory items satisfy a set of buyer preferences; and scoring the set of candidate inventory items with an affinity score.

20 Claims, 5 Drawing Sheets

SYSTEM, METHOD AND COMPUTER PROGRAM PRODUCT FOR PROVIDING A MULTIDIMENSIONAL INVENTORY MANAGEMENT SYSTEM

BACKGROUND OF THE INVENTION

1. Field of the Invention

The present invention relates to management of multidimensional inventory, and more particularly to a system and method for managing that inventory in a way that satisfies demand from multiple customer segments differentiated by a set of buyer preferences.

2. Related Art

Media providers include broadcast stations such as, e.g., television and radio stations and other media including such others as cable television systems. Generally, the media industry differs in its handling of inventory from other industries based on the product it sells, i.e., advertising. For example, the process by which media providers compute a price for a given amount and type of media exposure and provide a quote to an advertiser differs significantly from related inventory management processes in other industries.

While generally dissimilar, media inventory, i.e. advertising time slots, have some similarity to other industry inventory such as, e.g., airline seat inventory. In particular, both forms of inventory are perishable. Once a flight has taken place, the seat is no longer available for sale on that flight. Similarly, once the media program having an inventory item within which an advertising spot can be sold has run, that inventory item of advertising time is depleted.

Thus as noted above, for several reasons media inventory differs from other industries' inventory. A unique aspect of media inventory is that each inventory item can satisfy a variety of customers with different buying preferences to a greater or lesser extent, depending on the characteristics of the inventory item. Such characteristics can include, for example, time of day or day of the week of the advertising slot, characteristics of a program's audience, program popularity, and cost of advertising at a particular time. In addition, these inventory items are often packaged into groups to satisfy each customer's request. For example, an advertiser may want to run an advertisement a certain number of times per day or per week over the course of multiple weeks. The advertiser may want to reach a certain number of people within a target audience a certain number of times. In addition, the advertiser may be willing to purchase a group of advertising slots if a certain group of television shows are included in the package. For example a salesperson at a TV station conventionally bundles a number of advertising slots or inventory items together into a package in order to satisfy a given buyer's requirements. Finally, the number of transactions is small relative to the number of transactions in industries such as the airline industry. Because of the small number of transaction samples, it is conventionally very difficult, within the media industry, to capture complex packaging patterns of buyers in a traditional statistical model within distinct buyer segments.

Therefore, due to the small sample sizes, traditional inventory management models used by high volume but limited choice industries, such as the airline industry, are insufficient and inaccurate in their attempts to model demand within industries that involve complex transactions such as media distribution and broadcasting.

What is needed then is a tool that optimizes inventory allocation and pricing decisions that accurately reflect expected demand in various segments defined in terms of a set of customer preferences. It is further desirable that a tool be provided that better characterizes buyer behavior and that prices inventory in a way that maximizes revenue for a given level of demand.

SUMMARY OF THE INVENTION

An exemplary embodiment of the present invention sets forth a system, method and computer program product to dynamically allocate and reallocate inventory based on current and pending sales to ensure that the demand across multiple customer segments is optimally satisfied at a price that ensures the highest revenue for a given inventory. Such a process can acquire customer preferences at the point of sale, generate a proposal from existing inventory to satisfy at once the immediate demand for inventory and ensure that future demand is met by residual inventory, reallocate both available and committed inventory to accommodate both the current sale and future demand across demand segments, and communicate the inventory order to the billing process.

The present invention embodies such a process in a computer software system that can be web-enabled and easily accessible to all media station personnel at any time. The analytical components of the system provide optimal inventory allocation and pricing strategies across customer segments that are dynamically updated based on real-time sales activity.

An exemplary embodiment of the present invention sets forth a computer-implemented method of generating a package of advertising inventory items in response to a set of buyer requirements while optimizing both buyer preferences and a station's revenue objectives given an expected demand. In one exemplary embodiment, the method can include the steps of: selecting a set of candidate inventory items from an inventory of inventory items available for presenting advertising spots, where the set of candidate inventory items satisfy a set of buyer preferences; and scoring the set of candidate inventory items with an affinity score.

In an exemplary embodiment, the method can further include acquiring the set of buyer preferences in the form of an avail request.

In another exemplary embodiment, the method can further include pricing the set of candidate inventory items consistently according to an expected demand.

In yet another exemplary embodiment, the method can further include generating a proposal in the form of a package of inventory items selected as the best inventory items from the set of candidate inventory items based on the affinity score; submitting the proposal to a user for approval; and communicating an inventory order of the package of inventory items to a billing process when the proposal is approved.

In yet another exemplary embodiment, the method can further include reallocating the inventory according to the affinity score, including reallocating both available and committed inventory items to accommodate both a current sale and an expected demand across a plurality of demand segments.

In another exemplary embodiment, the method can further include extracting a current allocation status of the candidate inventory items from a transaction database; extracting station-specific candidate inventory selection criteria from a policy file; selecting the set of candidate inventory items from the inventory of inventory items that conform to the station specific candidate inventory selection criteria and have an allocation status of available; generating buyer attribute values from the set of buyer preferences, the avail request and buyer historical data; generating candidate inventory item attribute values for the set of candidate inventory items; computing the affinity score of a buyer to each of the set of candidate inventory items, based on the candidate inventory item attribute values and the buyer attribute values; and ranking the set of candidate inventory items from a highest affinity score to a lowest affinity score.

In another exemplary embodiment, the pricing step can further include the steps of: generating a short-term forecast from a sellout curve model using a transaction database including historical sales data; generating a mid-term forecast from a price distribution using the transaction database; generating a long-term forecast from a price trend model using the transaction database; integrating the short-term, mid-term and long-term forecasts into a price distribution forecast; generating a plurality of pricing tier boundaries from the price distribution forecast; allocating the set of candidate inventory items into pricing tiers, wherein an allocation efficiency is maximized; and pricing each of the set of candidate inventory items according to the affinity scores, the pricing tiers, and the expected demand.

In yet another exemplary embodiment, the step of generating a proposal can include the steps of: (a) extracting station-specific inventory item distribution criteria from a station policy file; (b) generating an initial set of candidate inventory item packages; (c) comparing each candidate inventory item package of the set of candidate inventory item packages with buyer requirements and seller requirements; (d) generating a package score for each candidate inventory item package of the initial set of candidate inventory item packages; (e) comparing each of the package scores with a score threshold; and (f) if at least one of the package scores exceeds the score threshold, selecting a best package from the initial set of candidate inventory item packages where the package score of the best package exceeds the score threshold; and (g) if none of the package scores exceeds the score threshold, (i) removing the candidate packages that have low scores relative to the score threshold from the initial set of candidate inventory item packages; (ii) generating a new set of candidate inventory item packages by combining remaining candidate inventory item packages in a candidate inventory item package pool; and (iii) repeating steps (c) through (g) until step (f) occurs.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements and where the first number of a reference numeral signs the first figure in which the references feature appears.

DETAILED DESCRIPTION OF AN EXEMPLARY EMBODIMENT OF THE PRESENT INVENTION

Figure 1:
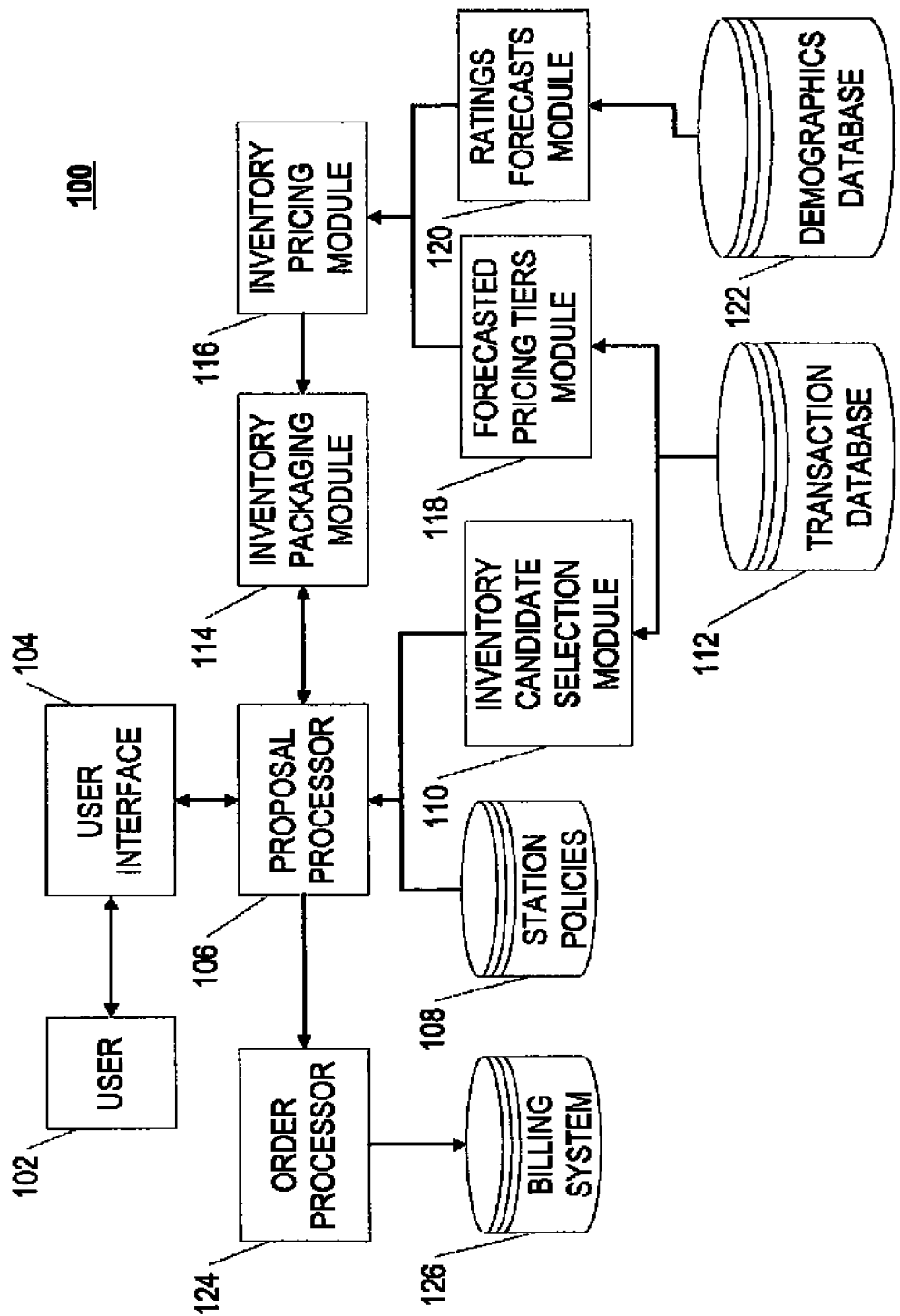
FIG. 1 depicts an exemplary embodiment of an integrated inventory management system according to the present invention.

A preferred embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

Inventory of advertising time slots at a broadcast station is perishable in that all inventory disappears when the associated programs that contain potential advertising time have aired. Up until the date that programs air; the inventory items associated with these programs are allocated to satisfy the demands of the buyers of advertising. The allocation of inventory items is typically dynamic as a result of the need to balance the demands of booked business, with the pending demands of buyers in the sales pipeline, as well as with the expected demand of buyers that have yet to announce a market buy.

Revenue realized through the sale of advertising time is highly dependent upon the inventory allocation strategy adopted by the broadcast station. For example, if a broadcast station sells too much inventory at a low price early, then the station will not be in a position to satisfy the needs of premium buyers later on. Alternatively, if too much inventory is allocated to satisfy expected future demand to the exclusion of current demand, then prices will have to be significantly lowered to attract enough buyers to sellout the inventory.

As a hedge against demand uncertainty, inventory allocation can be adjusted continuously to accommodate changes in demand. Continuous inventory allocation adjustment often takes the form of preempting booked business in favor of higher-priced pending business. Inventory for the preempted booked business can be re-allocated at a later time. The hope is that the lower-priced preempted business will be able to be placed at a time when demand is lower and therefore will not preclude the accommodation of premium business at a later date.

High preemption rates are a sign of allocation inefficiency due to poor demand forecasting. Allocation inefficiency manifests itself in terms of costs related to additional labor required to continuously re-allocate inventory as well as buyer dissatisfaction resulting from forced deviation from committed advertising plans. Minimization of allocation inefficiency as well as maximization of revenue realized from a given inventory is the objective of inventory allocation strategies governed by the principles of yield management according to the present invention.

At any point a given inventory item has a specific status related to the allocation of inventory to satisfy various classes of demand. The status of a given inventory item provides a detailed accounting of the current allocation of inventory to satisfy booked, pending, and expected demand within predefined pricing tiers. The setting of pricing tiers and the allocation of inventory within each tier is based upon a forecast of expected demand.

If recent sales activity indicate that the demand within pricing tiers is different from current forecasts, then forecasts may be adjusted and inventory re-allocated based on the inclusion of recent sales data in the forecasting process.

A buyer seeking to purchase advertising time from a TV or radio station can submit an avail request to the seller according to an exemplary embodiment of the present invention. An avail request is any request on the part of the buyer for information from the seller regarding inventory for sale. An avail request is also a vehicle for relating certain buyer preferences to the seller. Specifically, in an exemplary embodiment, preferences such as flight dates, target audience, overall cost-per-point, total budget and/or total gross rating points for a given market, daypart distribution of dollars and/or gross rating points, hit-listed programming (required programming exclusions) and target cost-per-point by daypart are examples of buyer preferences related to the seller by means of the avail request.

The seller can respond to the avail request from the buyer by providing a listing of programs within target day-parts complete with estimated demographic ratings for the buyer's target audience as well as rates for programs within flight dates. The seller can also promote specials, sporting events and other inventory items considered premium programming within the buyer's flight dates. Finally, a seller can provide a proposed package of inventory items designed to satisfy buyer preferences which can be discounted if purchased as a whole.

FIG. 1 illustrates an exemplary embodiment of the multi-dimensional inventory management system architecture 100 according to the present invention. The user 102 interacts with the system through user interface 104. User 102 can be, for example, a salesperson or seller of advertising at a television station. The user interface 104 allows the user 102 to enter an avail request and a set of customer preferences as well as allowing viewing a proposal and reports associated with the proposal. The user interface 104 in an exemplary embodiment, passes the data associated with the avail request and the set of customer preferences to the proposal processor 106. The proposal processor 106 in an exemplary embodiment acquires inventory candidate selection criteria from the station policies database 108. The proposal processor 106 sends the avail request and buyer preferences data as well as selection criteria to an inventory candidate selection module 110. Inventory candidate selection module 110 extracts candidate inventory items from transaction database 112, and returns the extracted candidate inventory items to the proposal processor 106. The proposal processor 106 then sends the candidate inventory items and avail request data to inventory packaging module 114. The inventory packaging module 114 can request pricing for each candidate inventory item from inventory pricing module 116. The inventory pricing module 116 can request pricing tier data from forecasted pricing tiers module 118. The forecasted pricing tier module 118 can extract necessary data from the transaction database 112, can compute pricing tiers for each candidate inventory item and can pass the pricing tiers back to the inventory pricing module 116. The inventory pricing module 116 can request demographic ratings from ratings forecasts module 120. The ratings forecasts module 120 can extract necessary data from the demographic database 122. The rating forecast modules 120 can compute ratings forecasts for each candidate inventory item and can pass the ratings forecasts back to the inventory forecasts pricing module 116, according to an exemplary embodiment. The inventory pricing module 116 can pass the pricing tiers and ratings forecasts back to the inventory packaging module 114. The inventory packaging module 114 can select the best candidates and can package them into a final proposal. The final proposal can be returned to the proposal processor 106, in an exemplary embodiment. The proposal processor 106 can return the proposal to the user interface 104. The user interface 104 displays the proposal to the user 102 and allows the user to interact with the application. Once the buyer approves the proposal and sends an order to the television station, the user 102 can then enter the order into the user interface 104. The proposal processor 106 can audit and reconcile the order with the final proposal and send the order to the order processor 124. The order processor 124 can send the final order to the billing system 126. In one exemplary embodiment, system 100 is web-enabled including access by, e.g., the user 102 via the user interface 104, in this case, a browser. Using the browser, user 102 can access via, e.g., a webserver (not shown) via a hypertext transfer protocol (http) universal resource locator (URL) to access an applications server (also not shown) such as, e.g., a database management system (DBMS). The applications server can include modules 110, 114, 116, 118 and 120, and processors 106 and 124, as well as provide access via the DBMS to databases 108, 126, 112 and 122.

Figure 2:
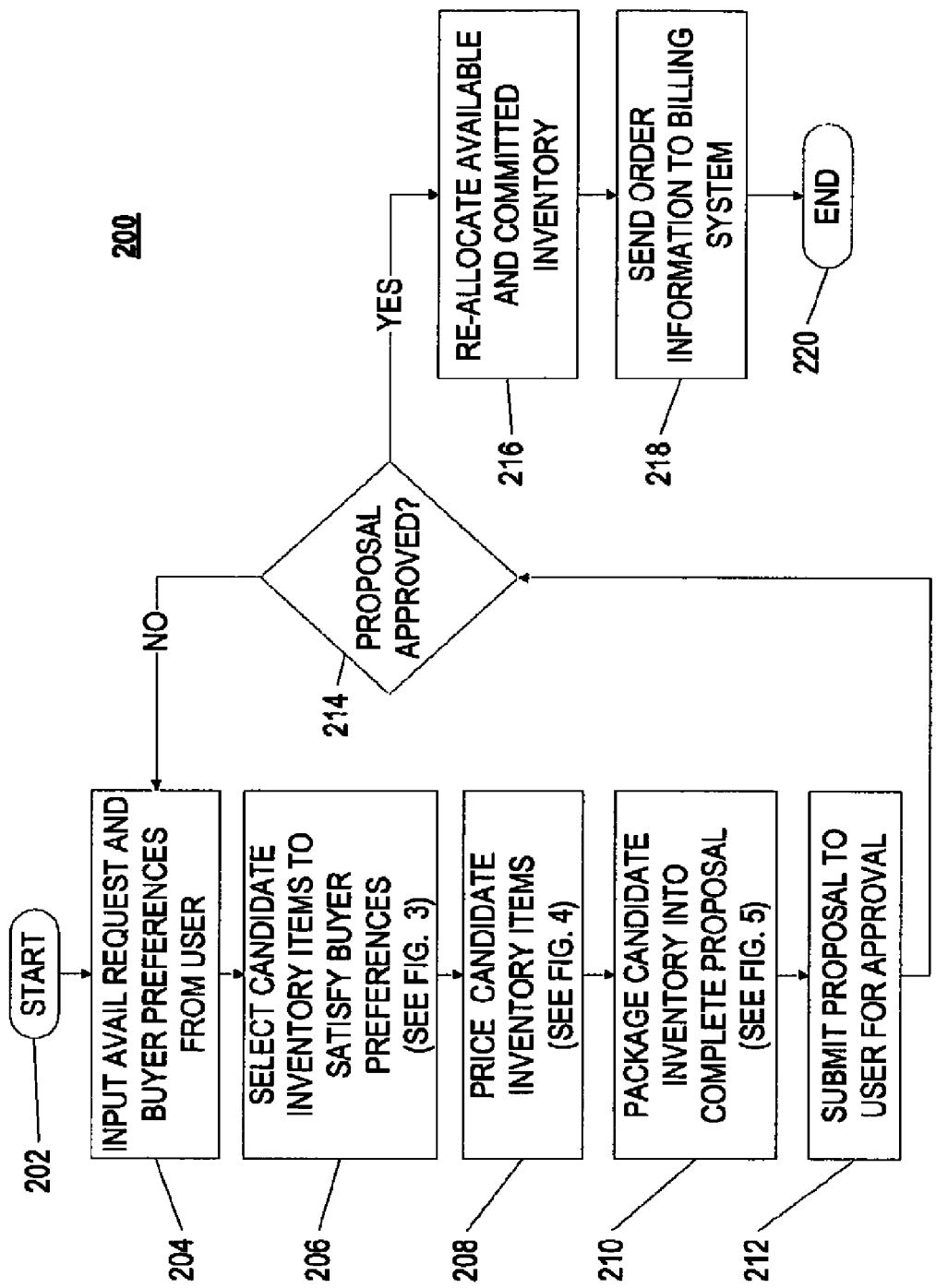
FIG. 2 illustrates an exemplary embodiment of a flowchart depicting the overall process according to the present invention.

FIG. 2 illustrates an exemplary embodiment of the process 200 of generating a proposal for sale of advertising spot inventory items according to the present invention. Process 200 start with step 202 and continues immediately with step 204. In step 204, the user 102 inputs an avail request for advertising spot inventory item availability and a set of buyer preferences. The user 102 can be, for example, a salesperson at a television station. Available inventory items matching the buyer's preferences can be selected in step 206. Step 206 is described in greater detail below with reference to FIG. 3. In step 200, using the advertising spot inventory availability, ratings forecasts and pricing tier forecasts, the candidate inventory items can be priced for the avail request. Step 208 is described in greater detail below with reference to FIG. 4. The available inventory, the pricing information, and the buyer preferences can be used to package available inventory items into a proposal for the buyer, in step 210. Step 210 is described further below with reference to FIG. 5. The inventory package reflects a placement of advertising slots or inventory items that optimally satisfy both the buyer preferences and the station's revenue objectives given expected demand. The package proposal can be submitted to the user 102 for approval, in step 212. If the proposal is not approved by the user at decision step 214, the process 200 can be iterated by the user 102, continuing with step 204 while adjusting slot selection parameters, until an acceptable proposal is generated. When the proposal is approved by the user 102 in step 214, then both available inventory and inventory committed to pending sales and current contracts can be re-allocated and a new distribution of available advertising spot inventory items can be computed across demand segments and within pricing tiers so as to accommodate both pending sales and future demand, in step 216. Finally, the order information corresponding to the approved proposal can be sent to the billing system and can be used to generate a contract. From step 218 the process can end at step 220.

Figure 3:
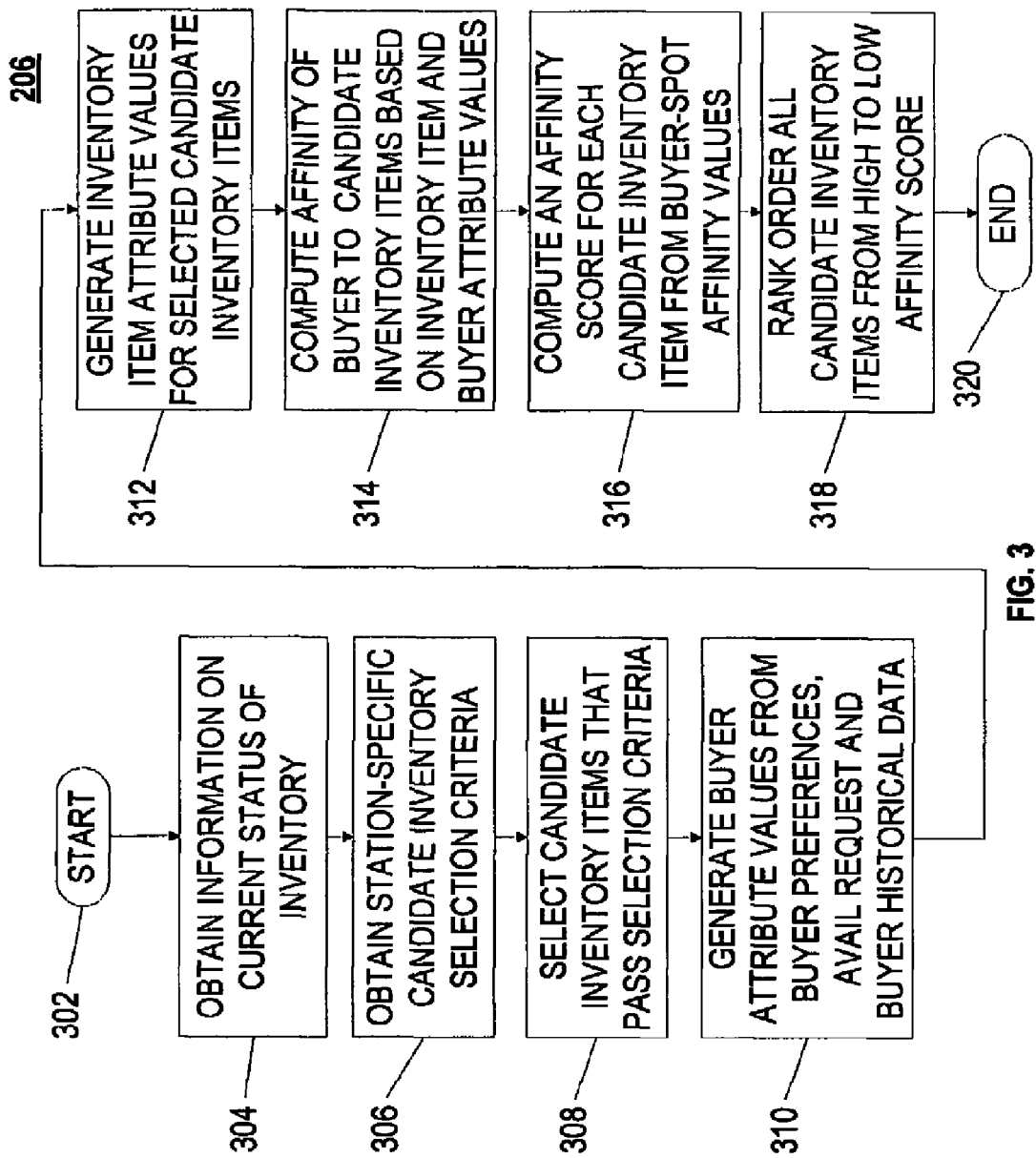
FIG. 3 illustrates an exemplary embodiment of a flowchart depicting the process of inventory candidate selection.

FIG. 3 illustrates an exemplary embodiment of step 206 including a flow diagram illustrating the selection and scoring of candidate inventory according to the present invention. FIG. 3 depicts an exemplary detailed description of step 206 of process 200 of FIG. 2. From step 302, process 206 continues immediately with step 304. In step 304 of the process 206, the status of current inventory can be determined from the station's transaction database 112. In step 306, station-specific candidate inventory selection criteria can be obtained from a policy file that can be maintained, for example, by a station sales manager. In step 308, the buyer preferences, inventory status, and the candidate selection policy can be used to select candidate inventory items that meet criteria for the proposal. In step 310, a set of buyer attribute values can be computed from the buyer preferences and the buyer historical data stored within the transaction database 112. The buyer attributes can be pre-defined as part of the system setup process. A specific value for each buyer attribute can be computed at the time of proposal generation and can reflect an aspect of the buyer's preferences in the purchase of advertising time. In step 312, inventory item attribute values can also be computed for each candidate inventory item. The attribute values reflect the relative suitability of advertising inventory item slots across all classes of buyer. In step 314, the buyer attribute values and the candidate inventory item attribute values can be used to compute an affinity of the current buyer to each candidate inventory item. Affinity of the buyer can be thought of as a distance between buyer preferences and a given advertising inventory item, measured in the space of all attributes. The larger the distance between the buyer attribute values and the inventory item attribute values, the lower the affinity between the buyer and the given inventory item. In step 316, the affinity measure can be used to compute an affinity score for each candidate inventory item from the affinity values. In step 318, the set of candidate inventory items can be rank ordered according to the respective affinity scores of the items from best to worst. In step 320, process 206 can proceed to end.

Figure 4:
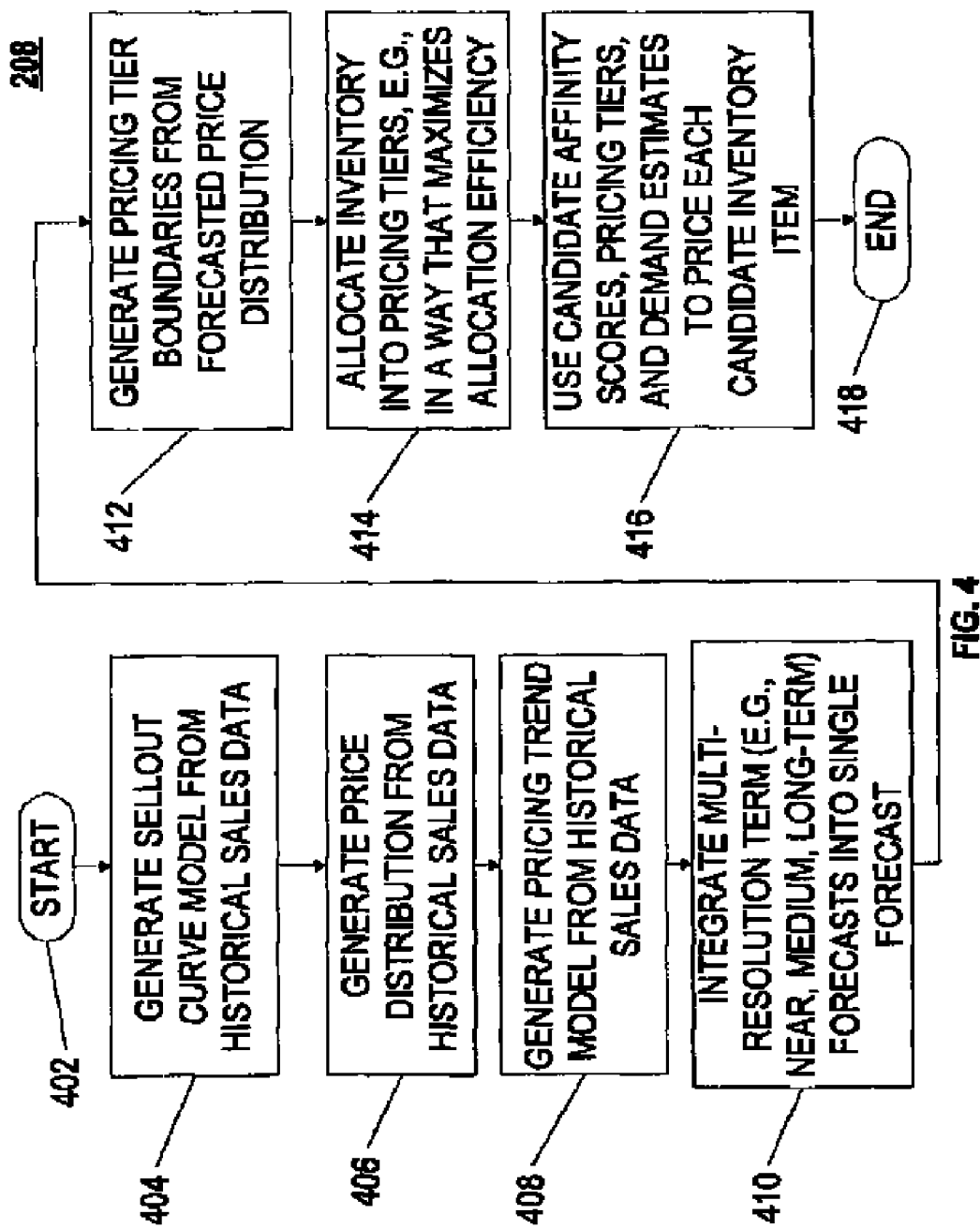
FIG. 4 illustrates an exemplary embodiment of a flow chart depicting the process of pricing tier forecasting.

FIG. 4 illustrates an exemplary embodiment of step 208 including the generation of pricing tier forecasts according to the present invention. FIG. 4 illustrates a detailed description of step 208 of the overall process of FIG. 2. Process 208 begins with step 402 and can continue immediately with step 404. In step 404, a sellout curve model can be computed from the transaction database 112. The sellout curve model provides a forecast of the amount and timing of sellout percentages for various classes of inventory items. The sellout curve model can, for example, use thirteen weeks of transaction data in computing a short-term forecast. In step 406, a price distribution model can be computed from historical sales data stored in the station's transaction database 112. The price distribution can reflect the probability of a transaction at a given price within a given demand segment and can use thirteen months of data to generate a mid-term pricing forecast. In step 408, a pricing trend model can be computed from the historical sales data stored in transaction database 112. The pricing trend model can reflect the changes in pricing for various classes of the inventory and can, e.g., use three years of data to generate a long-term pricing forecast. In step 410, the short-term, mid-term, and long-term pricing forecasts can be combined to generate a pricing distribution for each item of inventory (or groups of inventory items), and for each demand segment. In step 412, the forecasted pricing distributions can be used to generate pricing tier boundaries. In step 414, inventory can be allocated into pricing tiers. Preferably, the allocation of inventory into pricing tiers can be performed in such a way as to maximize allocation efficiency. Allocation efficiency is a score that measures the overall fit between demand attribute values and the inventory item attribute values of the inventory items allocated to satisfy the demand across demand segments and inventory classes. In step 416, candidate affinity scores, pricing tiers and demand estimates can be used to price each individual candidate inventory item. From step 418 the process 208 can end with step 420. The affinity score and the optimization of allocation efficiency are described in more detail below.

Figure 5:
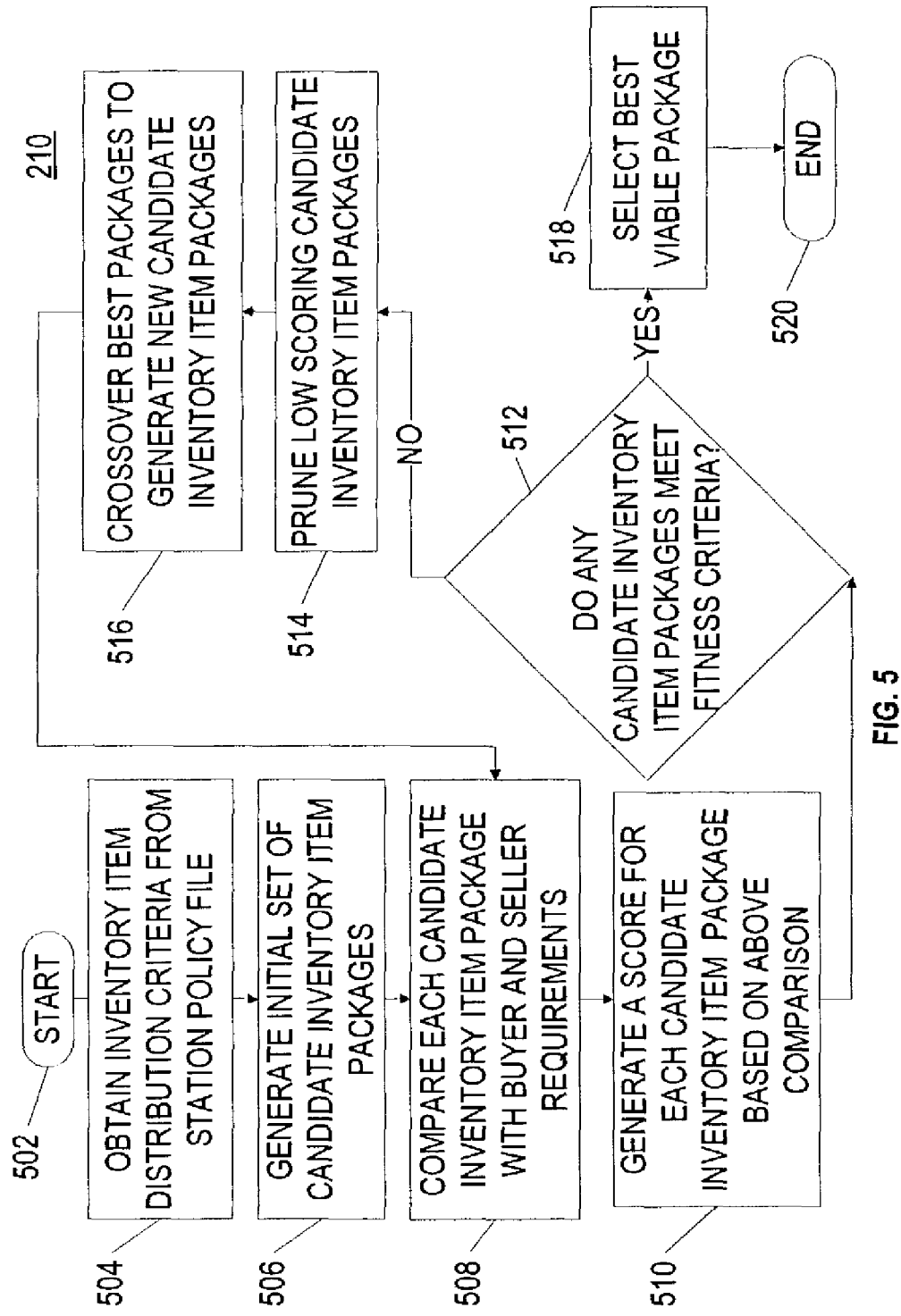
FIG. 5 illustrates the process of inventory packaging.

FIG. 5 illustrates an exemplary embodiment of process 210 including generation of inventory packages according to the present invention. FIG. 5 depicts an exemplary detailed description of step 210 of process 200 of FIG. 2. From step 502, process 210 can continue immediately with step 504. In step 504 of the process 210, the packaging process can read station-specific inventory items distribution criteria from the station policy file 108 that can be maintained, for example, by the sales manager. Inventory item distribution criteria can specify, for example, how inventory items selected for a package should be distributed within a given week, month or quarter so as to retain available inventory for high demand periods. In step 506, an initial set of proposed candidate inventory item packages can be generated. Each package can include a collection of advertising inventory items selected from the priced inventory item candidates that conform to the overall requirements in the buyer's avail request as constraints dictated by the inventory item distribution criteria. In step 508 a comparison can be made among the candidate inventory item packages as to the fit of the packages with respect to the buyer's preferences and to the seller's inventory item distribution criteria. In step 510, a fitness score can be computed based on the comparison performed in step 508. In step 512, scores can be examined to determine whether any of the candidate inventory item packages meet a fitness criteria score threshold. If none of the candidate packages meets the threshold, then a portion of the candidates with low fitness scores can be eliminated from the candidate pool in step 514. From step 514, process 210 can continue with step 516. In step 516, the remaining good candidate inventory item packages can be used to produce new candidates by, e.g., randomly combining attributes of candidate packages with the highest fitness scores to produce a new pool of candidate packages. From step 516, the process 210 can continue with step 508. In step 508, process 210 can iterate with the new candidate pool, starting at step 508, until at least one candidate inventory item package scores above the fitness score threshold of step 512. If it is determined in step 512 that there are candidate inventory item packages that meet or exceed the fitness score threshold, then the best viable package can be selected in step 518 based on the scores generated in step 510. From step 518, process 210 can end with step 522.

The Affinity Score and the Optimization of Allocation Efficiency

Classical Yield Management

Traditional Yield Management relies on linear programming techniques to optimize revenue for a given perishable inventory and a known level of demand. The basic problem can be formulated in terms of an objective function with a set of constraints.

$$\text{Maximize } R = \sum_{i=1}^{n} x_i r_i$$

Subject to:

$$\sum_{i=1}^{n} x_i \leq C$$

$$x_i \leq d_i$$

$$x_i, d_i \geq 0$$

where:
  i indexes across all pricing tiers
  n is the number of pricing tiers
  $r_i$ is the revenue per unit of i
  $x_i$ is the number of units of i
  C is total inventory capacity
  $d_i$ is the demand for units of i This classical yield management model assumes that rate classes which a typically associated with buyer classes are distinct and mutually exclusive. In most cases however, the buyer classes cannot be easily separated. To ensure that buyers associated with higher rate classes are not able to take advantage of lower rate classes a creative array of price barrier policies are implemented.

Even if buyers cannot be neatly separated into distinct classes their buying decisions are nonetheless influenced by sets of buyer preferences that affect the perceived value of a given product. These preferences can be used to differentiate potential buyers into rate classes based solely on this differential in perceived value. This is accomplished by setting up rate classes that reflect buyer affinity for a set of product attributes.

These product attributes constitute a multi-dimensional buyer affinity space, which allows pricing decisions to made based on demand across these attributes. This approach to yield management is particularly suited to situations where the number of transactions is relatively low and the nature of the buying decision tends to be rather complex, involving a number of products based on a variety of decision factors on the part of the buyer. An example of how this multi-dimensional approach to yield management is applied to media advertising is presented at the end of this paper.

We begin by introducing the basic concepts of yield management for multi-dimensional inventories and proceed to motivate the derivation of an objective function that must be maximized to optimize pricing and therefore revenue yield.

Multi-Dimensional Inventories

Lets assume that each unit of inventory, $u_j$, can be characterized in terms of a set of n attributes, $a_i$ $$u_j = [a_{1j}, a_{2j}, a_{3j}, \ldots a_{nj}]$$

Lets also assume that buyer's preferences can be expressed in terms of these same attributes so that both the inventory and buyer demand have same dimensionality and can be related by a metric that captures the relationship between product attributes and buyer preferences.

Buyer Affinity

Buyer Affinity is a numerical comparison between a given buyer's affinity factor vector and the attribute vector of a given unit of inventory. The buyer's affinity factor vector has the same dimensionality as the unit attribute vector:

$$F_i = [f_{1i}, f_{2i}, f_{3i}, \ldots f_{ni}]$$

where $F_i$ is the affinity factor vector for buyer class $b_i$ and $f_{ji}$ is the affinity factor corresponding to attribute $a_j$. Affinity factors are normalized to range between 0 and 1 and the larger the factor value for a given buyer class the more value a buyer within this class will assign to a unit possessing the corresponding attribute. A buyer's primary affinity is always equal to 1.0.

A buyer's affinity for a given unit of inventory, $u_k$, can be given by:

$$A_{ik}^b = \frac{F_i \cdot u_k}{\|F_i\| \cdot \|u_k\|}$$

where $F_i \cdot u_k$ is the dot-product between the buyer affinity factor vector for buyer class, $b_i$, and the attribute vector for unit $u_k$ and the denominator represents the product of the magnitudes of these two vectors. The resulting Buyer Affinity is therefore a maximum when the affinity vector and the unit attribute vector are parallel and will be a minimum when the two vectors are orthogonal.

Demand Segments

Multi-dimensional inventories imply multi-dimensional demand. Each unit has a capacity expressed in terms of each attribute, $a_i$, for which there is a given demand expressed in terms of aggregate buyer affinity. We can develop demand segments based on differential buyer affinity factor vectors by clustering buyer affinity through a vector quantization technique into distinct but not necessarily independent buyer classes, $b_i$. We define demand segment, $S_i$, as that segment of overall demand that is attributed to the vector quantized representation of buyer affinity within buyer class, $b_i$. The dimensions of $S_i$ are the same as the unit attribute and the affinity factor vectors. The length of the demand vector, $S_i$, is given by:

$$d_i = \|S_i\|$$

This represents the number of units with maximum buyer affinity (parallel with the aggregate buyer affinity vector) that is required to satisfy the demand of buyer class, $b_i$. Since generally each unit of inventory will only partially align with the aggregate preferences of each buyer class, the same efficiency measure introduced in the previous section can be used to represent the efficiency of a given unit with respect to a given demand segment.

Allocation Efficiency

The per unit revenue, $r_{ij}$, generated by a given transaction involving a buyer in class $b_i$, purchasing a given unit, $u_j$, will depend upon the level of demand within the buyer class and the buyer's affinity to that unit. If our inventory contained units with attribute vectors that perfectly mapped into the demand across buyer segments, we could compute the total expected revenue from a given inventory as follows:

$$R = \sum_i^N \sum_j^{d_i} r_{ij}$$

where N is the number of demand segments. In realistic applications our inventory will contain units that are more or less aligned with the demand segment vectors, $S_i$. An affinity measure can be defined in terms of the aggregate demand vector in the same way that our Buyer Affinity measure was defined:

$$A_{ik}^S = \frac{S_i \cdot u_k}{\|S_i\| \cdot \|u_k\|}$$

Most units of inventory will possess an affinity measure with respect to multiple demand segments having values between 0 and 1. Each unit of inventory should be allocated to that demand segment for which it will generate the highest per unit revenue. Per-unit-revenue is directly proportional to the magnitude of demand within the segment that a given unit is allocated.

$$r_{ij} \propto d_i$$

where unit $u_j$ is allocated to satisfy demand in demand segment $S_i$. The per-unit-revenue is also directly proportional to the unit's affinity measure with respect to the demand segment it is allocated to. This is due to the fact that a given unit satisfies a larger percentage of demand within a demand segment the closer its affinity measure with respect to that segment is to 1. Therefore we can posit that per-unit-revenue is a monotonic function the product, $d_i \cdot A_{ij}^S$ which can be represented as follows:

$$r_{ij} = f(d_i \cdot A_{ij}^S)$$

where, once again, unit $u_j$ is assumed to be allocated to satisfy demand in demand segment $S_i$.

We define allocation efficiency as an aggregate figure of merit that captures this relationship between revenue, unit efficiencies and multidimensional demand. Allocation efficiency, X, is the average unit affinity across all units, $u_j$, allocated across all demand segments, $S_j$, and is defined as follows:

$$X = \frac{1}{U} \sum_i^N \sum_j^{x_i} d_i \cdot A_{ij}^s$$

where U is the total number of units in the inventory and $x_i$ is the number of units allocated to demand segment $S_i$.

Optimizing Allocation Efficiency Maximizes Total Revenue

Given that the per-unit-revenue within a given multi-dimensional inventory is related to both the affinity between a given unit and the demand segment that it is allocated to and the magnitude of the demand within that segment, we maximize revenue for a given inventory by maximizing the following equation:

$$\text{Maximize } R = \sum_i^N \sum_j^{x_i} r_{ij} = \sum_i^N \sum_j^{x_i} f(d_i \cdot A_{ij})$$

where $x_i$ is the number of units allocated to satisfy demand within demand segment, $S_i$. Since f( ) is assumed to be a monotonic function of $d_i \cdot A_{ij}^S$, we can therefore maximize R by maximizing:

$$\text{Maximize } (U \cdot X) = \sum_i^N \sum_j^{x_i} d_i \cdot A_{ij}$$

Since U is a constant for any given inventory, we can maximize revenue by maximizing its Allocation Efficiency.

$$\text{Maximize } X = \frac{1}{U} \sum_i^N \sum_j^{x_i} d_i \cdot A_{ij}^s$$

Subject to the following constraints:

$$\sum_i^N x_i \leq C$$

$$\sum_j^{x_i} u_j \cdot A_{ij}^s \leq d_i$$

$$x_i, d_i \geq 0$$

This objective function provides an efficient means of optimizing allocation and therefore revenue generation for multidimensional inventories.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer-implemented method of generating packages of advertising inventory items in response to a request from a buyer while optimizing both preferences of the buyer and a station's revenue objectives given an expected demand, the method comprising:
   employing a computing device having a processor and a memory associated therewith to execute instructions configured to implement the method, the instructions comprising:
   generating, via the computing device, a set of buyer attribute values from the preferences of the buyer;
   selecting, via the computing device, a set of candidate inventory items from an inventory of inventory items available for presenting advertising spots, wherein each candidate inventory item of the set of candidate inventory items satisfies two or more of the buyer preferences;
   generating, via the computing device, candidate inventory item attribute values for each inventory item of the set of candidate inventory items, wherein the candidate inventory attribute values reflect suitability of the respective candidate inventory item across a plurality of buyers; and
   deriving, via the computing device, an affinity score for each candidate inventory item of the set of candidate inventory items, the affinity score representing a mathematical distance between the set of buyer attribute values and the candidate inventory item attribute values associated with each respective candidate inventory item,
   wherein the larger the distance between the buyer attribute values and the candidate inventory item attribute values associated with a particular candidate inventory item, the lower the affinity between the buyer and the particular candidate inventory item.

2. The method according to claim 1, further comprising:
   acquiring the buyer preferences in the form of an avail request.

3. The method according to claim 1, further comprising:
   pricing the set of candidate inventory items according to the expected demand, wherein the expected demand is forecast using sales data for the inventory of inventory items.

4. The method according to claim 1, further comprising:
   generating a proposal in the form of a package of advertising inventory items selected as the best inventory items from the set of candidate inventory items based on each respective affinity score;
   submitting the proposal to a user for approval; and communicating an inventory order of the package of advertising inventory items to a billing process when the proposal is approved.

5. The method according to claim 1, further comprising:
allocating each candidate inventory item of the set of candidate inventory items according to each respective affinity score, to accommodate the expected demand across a plurality of demand segments, wherein each demand segment represents an overall demand attributed to a buyer class, and wherein each buyer class is determined by clustering buyers according to their respective buyer preferences.

6. The method according to claim 2, further comprising the steps of:
extracting a current allocation status of the candidate inventory items from a transaction database;
extracting station-specific candidate inventory selection criteria from a policy file;
selecting the set of candidate inventory items from the inventory of inventory items such that each candidate inventory item of the set of candidate inventory items conforms to the station-specific candidate inventory selection criteria and has the current allocation status of available; and
ranking each candidate inventory item of the set of candidate inventory items from a highest affinity score to a lowest affinity score.

7. The method according to claim 3, wherein the pricing step further comprises the steps of:
generating a short-term forecast from a sellout curve model using a transaction database including historical sales data;
generating a mid-term forecast from a price distribution using the transaction database;
generating a long-term forecast from a price trend model using the transaction database;
integrating the short-term, mid-term and long-term forecasts into a price distribution forecast;
generating a plurality of pricing tier boundaries from the price distribution forecast;
allocating the set of candidate inventory items into pricing tiers, wherein an allocation efficiency is maximized; and
pricing each candidate inventory item of the set of candidate inventory items according to each respective affinity score, the pricing tiers, and the expected demand.

8. The method of claim 4, wherein the step of generating a proposal comprises the steps of:
(a) extracting station-specific inventory item distribution criteria from a station policy file;
(b) generating an initial set of candidate inventory item packages;
(c) comparing each candidate inventory item package of the initial set of candidate inventory item packages with a set of buyer requirements and seller requirements;
(d) generating a package score for each candidate inventory item package of the initial set of candidate inventory item packages based on the comparison;
(e) comparing each of the package scores with a score threshold; and
(f) if at least one of the package scores exceeds the score threshold, selecting a best package from the initial set of candidate inventory item packages wherein the package score of the best package exceeds the score threshold; and
(g) if none of the package scores exceeds the score threshold, (i) removing the candidate packages that have low scores relative to the score threshold from the initial set of candidate inventory item packages;
(ii) generating a new set of candidate inventory packages by combining attributes of remaining candidate inventory item packages in a candidate inventory item package pool; and
(iii) repeating steps (c) through (g) until step (f) occurs.

9. One or more computer storage media storing computer-useable instructions for causing one or more computing devices to perform a method of generating packages of advertising time slots in order to satisfy a buyer's request while optimizing a station's revenue objectives given an expected demand for advertising time slots, the method comprising the steps of:
receiving the buyer's request, wherein the buyer's request includes a demand for information regarding purchasing advertising time slots;
extracting from the buyer's request one or more buyer preferences, the one or more buyer preferences reflecting parameters of an optimal package of advertising time slots as desired by the buyer;
generating a buyer attribute value for the buyer utilizing the one or more buyer preferences;
selecting a set of candidate advertising time slots from an inventory of advertising time slots available for presenting advertising spots, wherein each advertising time slot of the set of candidate advertising time slots satisfies one or more buyer preferences;
generating a candidate attribute value for each advertising time slot of the set of candidate advertising time slots, wherein the candidate attribute value reflects suitability of the respective candidate advertising time slot across a plurality of buyers; and
deriving an affinity score for each candidate advertising time slot of the set of candidate advertising time slots, the affinity score representing a mathematical distance between the buyer attribute value and the candidate attribute value associated with each respective candidate advertising time slot, wherein the larger the distance between the buyer attribute values and the candidate attribute value associated with a particular advertising time slot, the lower the affinity between the buyer and the particular candidate advertising time slot.

10. The one or more computer storage media according to claim 9, further comprising:
pricing the set of candidate advertising time slots according to the expected demand, wherein the expected demand is forecast using sales data for the an inventory of advertising time slots.

11. The one or more computer storage media according to claim 9, further comprising:
generating a proposal in the form of the package of advertising time slots selected as the best advertising time slots from the set of candidate advertising time slots based on each respective affinity score;
submitting the proposal to a user for approval; and
communicating an order of the package of advertising time slots to a billing process when the proposal is approved.

12. The one or more computer storage media according to claim 9, wherein the buyer preferences include one or more of target audience, cost-per-point, total budget, required programming exclusions and target-cost-per-point.

13. The one or more computer storage media according to claim 9, further comprising:
allocating each advertising time slot from the set of candidate advertising time slots according to each respective affinity score to accommodate the expected demand for each advertising time slot across a plurality of demand segments, wherein each demand segment represents an overall demand attributed to a buyer class, and wherein the buyer class is determined by clustering buyers according to their buyer attribute values.

14. The one or more computer storage media according to claim 9, further comprising the steps of:
   extracting a current allocation status of the candidate advertising time slots from a transaction database;
   extracting station-specific candidate advertising time slot selection criteria from a policy file;
   selecting the set of candidate advertising time slots from the inventory of advertising time slots such that each candidate advertising time slot conforms to the station-specific candidate advertising time slot selection criteria and has an allocation status of available; and
   ranking each advertising time slot of the set of candidate advertising time slots from a highest affinity score to a lowest affinity score.

15. The one or more computer storage media according to claim 10, wherein the pricing step further comprises the steps of:
   generating a short-term forecast from a sellout curve model using a transaction database including historical sales data;
   generating a mid-term forecast from a price distribution using the transaction database;
   generating a long-term forecast from a price trend model using the transaction database;
   integrating the short-term, mid-term and long-term forecasts into a price distribution forecast;
   generating a plurality of pricing tier boundaries from the price distribution forecast;
   allocating the set of candidate advertising time slots into pricing tiers, wherein an allocation efficiency is maximized; and
   pricing each advertising time slot of the set of candidate advertising time slots according to each respective affinity scores, the pricing tiers, and the expected demand.

16. The one or more computer storage media of claim 11 wherein the step of generating a proposal comprises the steps of:
   (a) extracting station-specific inventory item distribution criteria from a station policy file;
   (b) generating an initial set of candidate inventory item packages;
   (c) comparing each candidate inventory item package of the set of candidate inventory item packages with the set of buyer requirements and seller requirements;
   (d) generating a package score for each candidate inventory item package of the initial set of candidate inventory item packages based on the comparison;
   (e) comparing each of the package scores with a score threshold; and
   (f) if at least one of the package scores exceeds the score threshold, selecting a best package from the initial set of candidate inventory item packages wherein the package score of the best package exceeds the score threshold; and
   (g) if none of the package scores exceeds the score threshold,
      (i) removing the candidate packages that have low scores relative to the score threshold from the initial set of candidate inventory item packages;
      (ii) generating a new set of candidate inventory packages by combining attributes of remaining candidate inventory item packages in a candidate inventory item package pool; and
      (iii) repeating steps (c) through (g) until step (f) occurs.

17. A computer system for generating packages of advertising time slots in response to a buyer's request while optimizing both buyer preferences and a station's revenue objectives given an expected demand, the system comprising:
   a buyer attribute value component for generating a buyer attribute value for the buyer utilizing the buyer's request and one or more buyer preferences, the one or more buyer preferences reflecting parameters of an optimal package of advertising time slots as desired by the buyer;
   a selection component for selecting a set of candidate advertising time slots from an inventory of advertising time slots available for presenting advertising spots, wherein each advertising time slot of the set of candidate advertising time slots satisfies one or more buyer preferences;
   a derivation component for deriving an affinity score for each candidate advertising time slot of the set of candidate advertising time slots, the affinity score representing a mathematical distance between the buyer attribute value and the candidate attribute value associated with each respective candidate advertising time slot, wherein the larger the distance between the buyer attribute values and the candidate attribute value associated with a particular advertising time slot, the lower the affinity between the buyer and the particular candidate advertising time slot; and
   an allocation component for allocating each advertising time slot from the set of candidate advertising time slots according to each respective affinity score to accommodate the expected demand for each advertising time slot across a plurality of demand segments.

18. The system according to claim 17, further comprising a proposal component for generating a proposal in the form of the package of advertising time slots selected as the best advertising time slots from the set of candidate advertising time slots based on each respective affinity score, for submitting the proposal to a user for approval, and for communicating an order of the package of advertising time slots to a billing process when the proposal is approved.

19. The system according to claim 17, further comprising a pricing component for pricing the set of candidate advertising time slots according to the expected demand, wherein the expected demand is forecast using sales data for the an inventory of advertising time slots.

20. The system according to claim 17, further comprising:
   an extraction component for extracting a current allocation status of the candidate advertising time slots from a transaction database and for extracting station-specific candidate advertising time slot selection criteria from a policy file;
   a second selection component for selecting the set of candidate advertising time slots from the inventory of advertising time slots such that each candidate advertising time slot conforms to the station-specific candidate advertising time slot selection criteria and has an allocation status of available; and
   a ranking component for ranking each advertising time slot of the set of candidate advertising time slots from a highest affinity score to a lowest affinity score.

* * * * *